(12) United States Patent
Kimura et al.

(10) Patent No.: US 7,056,445 B2
(45) Date of Patent: Jun. 6, 2006

(54) METHOD OF REMOVING PAINT APPLIED TO MAGNESIUM-ALLOY MATERIAL

(75) Inventors: Koichi Kimura, Kawasaki (JP); Kota Nishii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 137 days.

(21) Appl. No.: 10/642,133

(22) Filed: Aug. 18, 2003

(65) Prior Publication Data

US 2004/0045590 A1 Mar. 11, 2004

(30) Foreign Application Priority Data

Sep. 11, 2002 (JP) .............................. 2002-264903

(51) Int. Cl.
*B44C 1/22* (2006.01)
*B08B 7/00* (2006.01)

(52) U.S. Cl. .......................................... 216/52; 134/38

(58) Field of Classification Search ................. 216/83, 216/95, 100, 52; 134/38, 41, 26
See application file for complete search history.

(56) References Cited

U.S. PATENT DOCUMENTS

| | | | | |
|---|---|---|---|---|
| 3,615,827 A | * | 10/1971 | Murphy | 134/38 |
| 4,900,364 A | * | 2/1990 | Diedrich | 134/4 |
| 5,384,990 A | * | 1/1995 | Spears, Jr. | 451/38 |
| 5,961,807 A | * | 10/1999 | Daum et al. | 205/136 |
| 6,296,718 B1 | * | 10/2001 | Miles | 134/19 |
| 6,569,264 B1 | * | 5/2003 | Fukumura et al. | 148/259 |

FOREIGN PATENT DOCUMENTS

| | | |
|---|---|---|
| JP | 2000-263443 | 9/2000 |
| JP | 2001-316739 | 11/2001 |

* cited by examiner

*Primary Examiner*—Parviz Hassanzadeh
*Assistant Examiner*—Roberts Culbert
(74) *Attorney, Agent, or Firm*—Staas & Halsey LLP

(57) ABSTRACT

A method is provided for removing a paint layer formed on a Mg-alloy material. The method includes a physical removing step and a chemical removing step. At the physical removing step, the paint layer is partially removed by using a cutter or by wet blasting. Then, the paint layer is peeled by immersing the Mg-alloy material in an alkali parting agent.

12 Claims, 4 Drawing Sheets

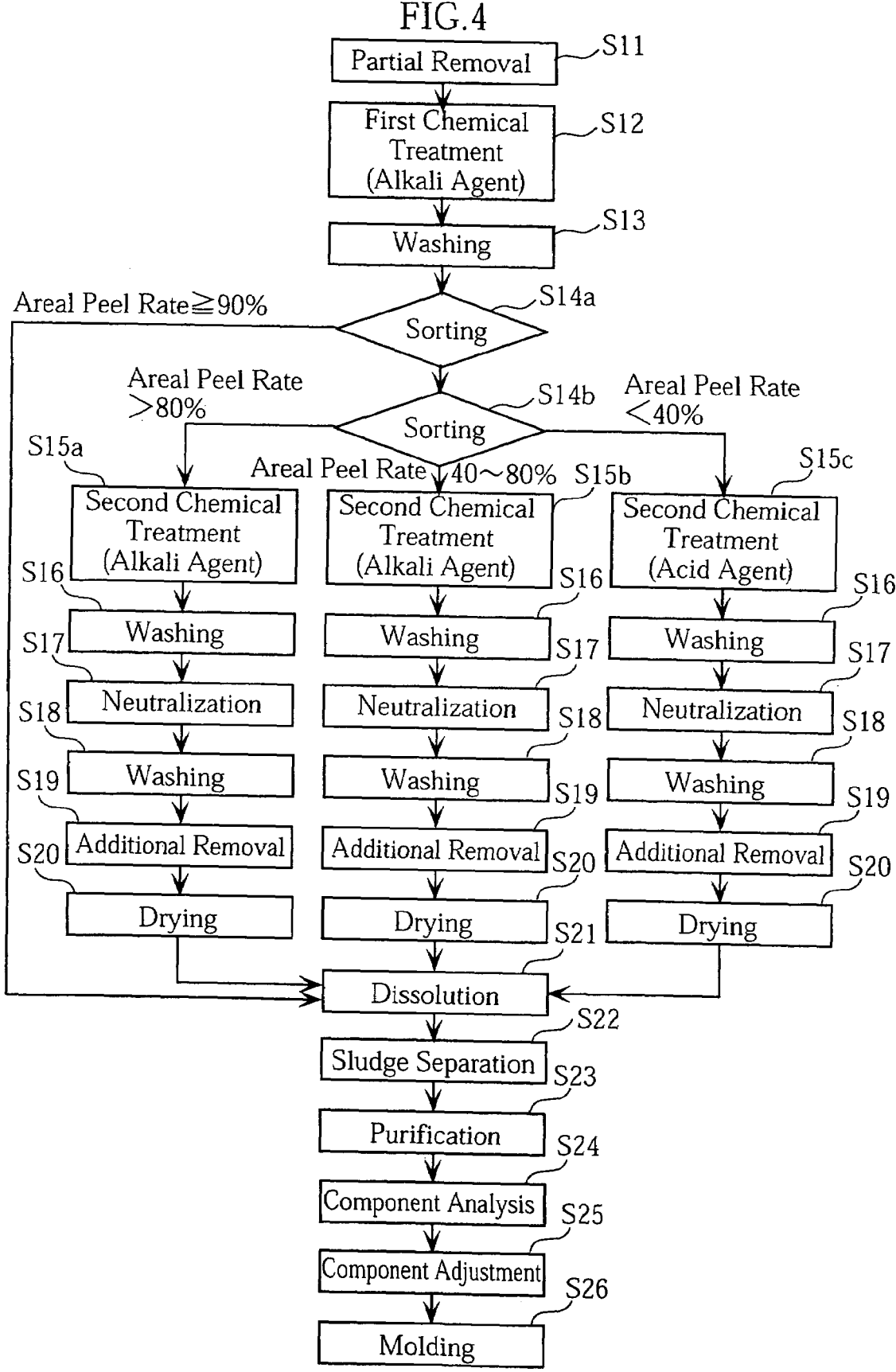

METHOD OF REMOVING PAINT APPLIED TO MAGNESIUM-ALLOY MATERIAL

BACKGROUND OF THE INVENTION

1. Field of the Invention

The present invention relates to a recycling technique for objects made of a magnesium alloy. In particular, it relates to a technique for removing the paint applied to an object made of a magnesium alloy. The present invention is applicable, for instance, to the removal of paint applied on the housing of a notebook computer, a cellular phone, etc.

2. Description of the Related Art

The housing of a mobile electronic device such as a notebook computer, a cellular phone and a PDA, should be made of a mechanically strong, heat-conductive and recyclable material. To meet these requirements, use is often made of metals rather than resins in making a housing.

Metals suitable for the housing fabrication are a magnesium alloy and an aluminum alloy, for example, with the use of which the weight reduction of the resultant product can be achieved. Of the two elements Mg and Al, magnesium has a greater specific tensile strength, equal heat-dissipating properties, and a smaller specific weight (about 70%) in comparison with aluminum. Thus, the Mg-based alloy is more advantageous for making the housing of an electronic device than the Al-based alloy.

For forming a desired component (housing of a notebook computer, for example) from a Mg alloy, die-casting or thixo molding may be employed. By these methods, however, an excessive amount of molten Mg alloy is needed. Specifically, in making a computer housing, 30~50% of the supplied material is used for forming the desired component, while the remaining 50~70% of the material is used for producing unnecessary parts that do not belong to the desired component. Typically, the unnecessary parts stem from the portion of the supplied material that is hardened in the sprue or runner in the molding die. To make effective use of the resources and attain cost reduction, the unnecessary parts should be recycled so that the material is used for another injection molding process.

A conventional recycling method is disclosed in Japanese patent application laid-open No. 2001-316739, for example. By the method, unnecessary portions of the hardened magnesium alloy is heated up, together with flux, to melt. Then, in the molten state, the ingredient adjustment is performed for the material. Finally, the material is allowed to cool down for solidification. Thus, a recycled magnesium alloy is obtained.

The above conventional method, however, suffers the following drawback. In general, a component of a magnesium alloy is painted for e.g. decorative purposes, and the paint often contains acrylic resin or urethane resin. Under such circumstances, an unacceptable amount of organic gas may be produced when the acrylic resin or urethane resin of the paint is burnt in heating up the Mg-alloy component for recycling. In addition, titanium contained in the applied paint may contaminate the molten alloy.

To overcome the above problems, the applied paint needs to be removed before the Mg-alloy component is heated up for recycling. For the paint removal, use may be made of a wet blasting technique as disclosed in Japanese patent application laid-open No. 2000-263443, for example. By the wet blast, inorganic particles (made of e.g. alumina) are caused to impinge on the painted Mg-alloy component by the flow of the water jet, so as to scrape the paint layer off the Mg-alloy component. In this manner, however, it is often difficult to completely remove the paint from the Mg-alloy component since the abrasive particles may fail to reach the paint material in the tiny pits in the component's surface.

Another known technique for removing the paint applied on a Mg-alloy component utilizes an alkali parting agent. By this method, the painted Mg-alloy component is immersed in the parting agent so that the paint layer swells by absorption of the agent. Thereafter, the paint layer can be washed away from the component's surface by running water, for example. Unfavorably, it often takes a long time, say two hours, to complete this process since the swelling of the entire paint layer (typically consisting of a lower layer and an upper layer) does not take place quickly.

SUMMARY OF THE INVENTION

The present invention has been proposed under the circumstances described above. It is, therefore, an object of the present invention to provide a paint-removing technique that can be performed more quickly than is conventionally possible.

According to the present invention, there is provided a method of removing a paint layer formed on a Mg-alloy material. The method comprising: a partial removing step for physically and partially removing the paint layer; and a first chemical removing step for peeling the paint layer by application of a first alkali parting agent to the paint layer.

Preferably, the partial removing step may be conducted to make cuts in the paint layer by a cutter or to perform wet blasting to the paint layer.

Preferably, the partial removing step may be conducted to remove 20~50% of the paint layer.

Preferably, the method of the present invention may further comprise a second chemical removing step utilizing another parting agent different from the first alkali parting agent. The second chemical removing step may be conducted to the paint layer when an areal peel rate of the paint layer is smaller than 90% after the first chemical removing step.

Preferably, the second chemical removing step may be conducted by using one of a plurality of parting agents in accordance with the areal peel rate of the paint layer.

Preferably, the plurality of parting agents may include an acid parting agent and a second alkali parting agent different from the first alkali parting agent.

Preferably, the first alkali parting agent may contain potassium hydroxide.

Preferably, the acid parting agent may contain an organic acid.

Preferably, the method of the present invention may further comprise a step for neutralizing an acid parting agent applied on the paint layer.

Preferably, the neutralizing step may be conducted by using sodium hydroxide.

Preferably, the method of the present invention may further comprise a physical removing step for removing the paint layer after the second chemical removing step is conducted.

Preferably, the method of the present invention may further comprise a washing step for washing the Mg-alloy material by water immediately after the first chemical removing step.

Preferably, a cycle including the first chemical removing step and the second chemical removing step may be conducted repeatedly.

Other features and advantages of the present invention will become apparent from the detailed description given below with reference to the accompanying drawings.

BRIEF DESCRIPTION OF THE DRAWINGS

FIG. 4 is a flow chart showing a material reproducing procedure in accordance with still another embodiment of the present invention.

DETAILED DESCRIPTION OF THE PREFERRED EMBODIMENTS

Preferred embodiments of the present invention will be described below with reference to the accompanying drawings.

Figure 1:
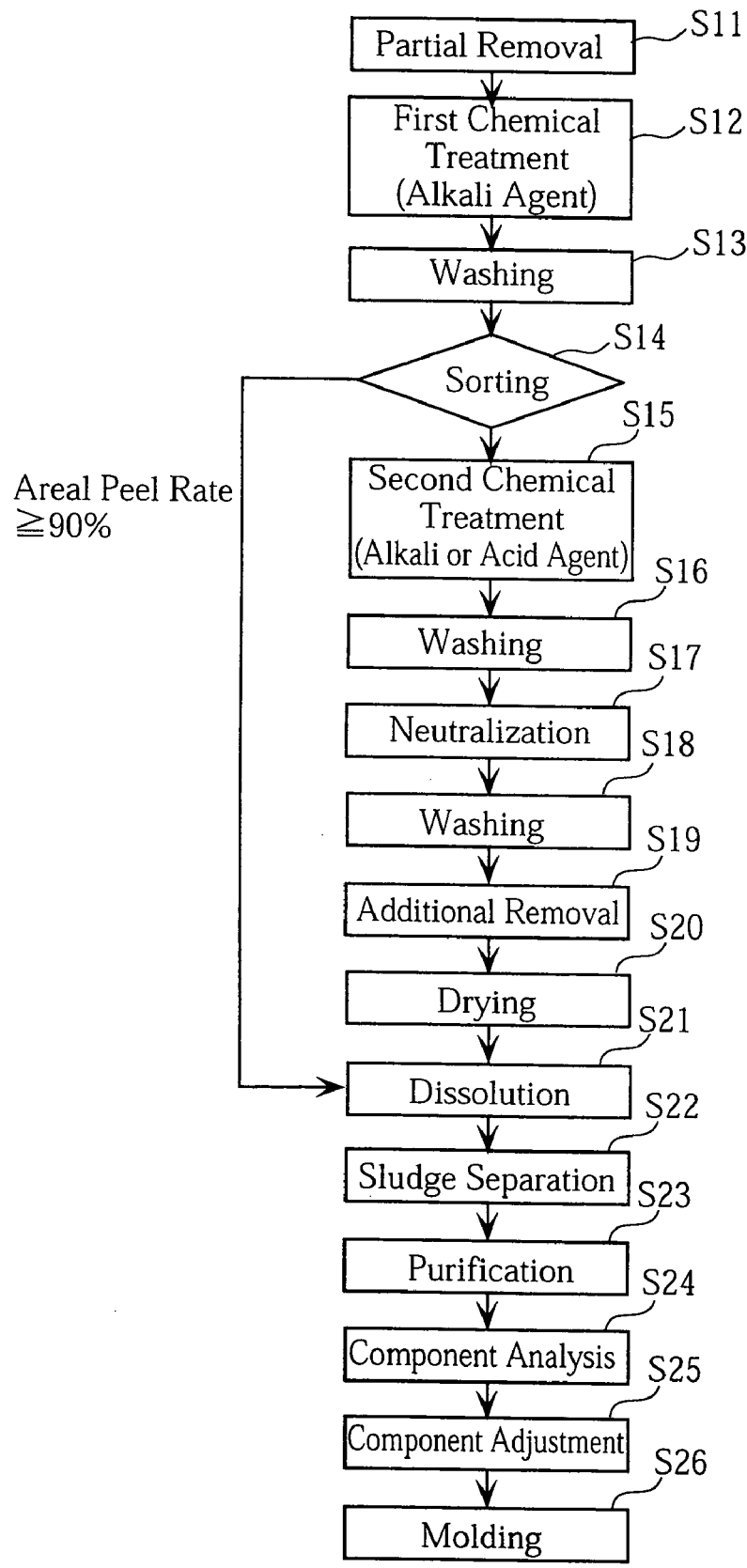
FIG. 1 is a flow chart showing a material reproducing procedure in accordance with an embodiment of the present invention.
Figure 2:
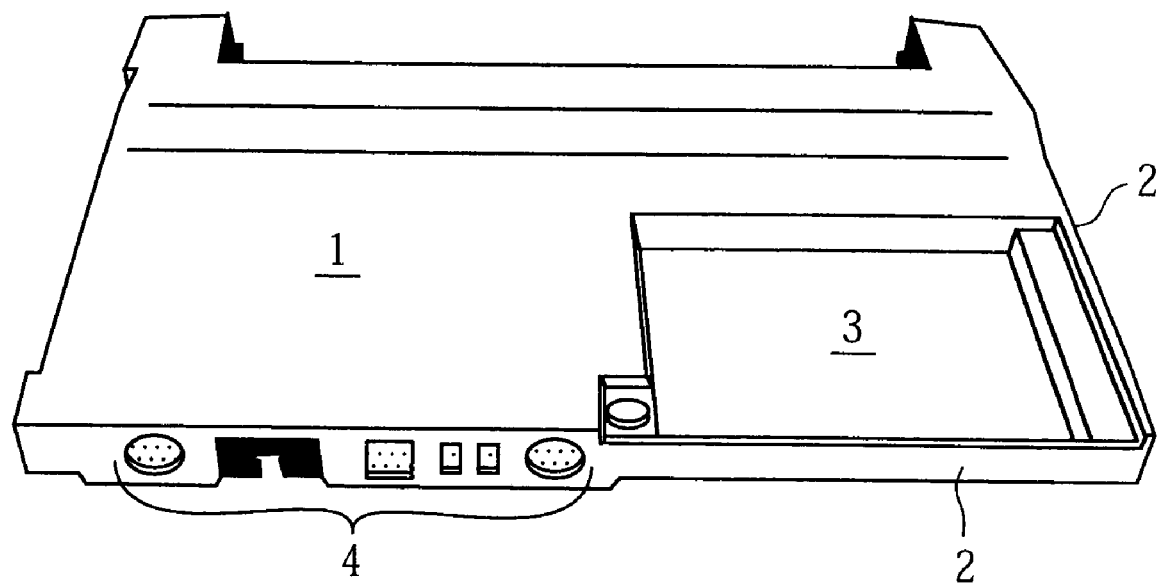
FIG. 2 shows a housing of a notebook computer to which the present invention is applicable.

FIG. 1 is a flow chart illustrating the process of a paint removing method according to a first embodiment of the present invention, while also showing a Mg-alloy recycling process subsequent to the paint removing process. The paint removing process may be applicable to the removal of a paint layer formed on the Mg-alloy housing of a notebook computer, as shown in FIG. 2. The applied paint may contain two layers: an upper layer for providing the desired color and a lower layer (primer) for securing the upper layer to the Mg-alloy housing. Such a paint may be made from an epoxy resin, urethane resin, or acrylic resin, for example. Specifically, for the epoxy resin paint, use may be made of an epoxy amino resin paint, epoxy ester paint, epoxy zinc-rich primer, epoxy tar (or tar epoxy) paint, epoxy phenol resin, or epoxy polyamide paint. For the urethane resin paint, use may be made of two-part urethane paint, moisture curing urethane paint, or oxidative curing urethane paint, for example. For the acrylic resin paint, use may be made of a polymer of acrylic monomers such as acrylic or methacrylic acid ester.

At Step 11 (S11), the paint layer formed on the Mg-alloy housing is partially removed. One way to achieve this is to use cutters, by which a number of cuts may be made in the paint layer. Another way is to utilize wet blasting, whereby inorganic particles (made of e.g. alumina) are caused to strike on the paint layer by a strong flow of water. In the case of using cutters, it is preferable that the cuts in the paint layer are deep enough to reach the boundary surface between the primer and the Mg-alloy housing. The wet blasting may preferably be continued until at least the upper layer of the paint (about 20~50% of the entire paint material) is removed.

At Step 12 subsequent to Step 11, a first chemical treatment is performed. Specifically, the painted housing is immersed in an alkali parting agent ("first parting agent"). The volume of the first parting agent to be used may be 10~20 times that of the housing. The temperature of the first parting agent may be 50~90° C., and the immersion time may be 5~30 minutes. The first parting agent may contain a hydroxide of alkali metal or alkaline-earth metal (in particular, 2~40 wt % of potassium hydroxide). By the first chemical treatment, the paint layer is partially detached from the surface of the housing. The rest of the paint layer is partially swelled by the absorption of the first parting agent. At the swelled paint portion, the adhesion of the paint layer to the housing is weakened.

After taken out of the first parting agent, the housing is washed by water (Step 13), so that the paint material on the housing surface (in particular the swelled paint material) can be removed. This may be achieved by using a shower. The hydraulic pressure may be 0.5~2 kgf/cm$^2$. Instead of using a shower, the housing may be washed in a water bath for removal of the paint material.

At Step 14, the housing is subjected to a sorting process. First, it is determined how much of the paint applied to the housing has been removed by the above-mentioned steps 11~13. According to the present invention, the quantity of the removal is evaluated by the "areal peel rate" which is calculated by the formula (X÷Y)×100, where X represents the housing's surface area exposed by the paint removal of Steps 11~13, while Y represents the housing's surface area initially covered by the applied paint material. If the areal peel rate is equal to or greater than 90%, the housing is subjected to a drying process and to the dissolution at Step 21. (Before being dried, the housing may be subjected to neutralization as performed at Step 17 washing at Step 18, and paint removal at Step 19.) If the areal peel rate is smaller than 90%, the housing is subjected to Step 15 whereby the housing is immersed in an alkali parting agent ("second alkali parting agent"). In place of the alkali agent, use may be made of an acid parting agent.

The volume of the second alkali parting agent to be use,d may be 10~20 times that of the housing. The temperature of the agent may be 50~90° C. The immersion time may be 10~30 minutes. The agent may contain a hydroxide of alkali metal or alkali-earth metal (preferably, 2~40 wt % of potassium hydroxide). The second alkali parting agent may have the same composition as the first alkali parting agent. By the treatment of Step 15, part of the paint material is swelled, whereby the adhesion to the housing becomes weaker. Another part of the paint material is detached from the housing.

The volume of the above-mentioned acid parting agent, a substitute for the second alkali parting agent, may be 10~20 times greater than that of the housing. The temperature of the acid parting agent may be 20~70° C. The immersion time may be 5~30 minutes. The acid parting agent may preferably contain an organic acid such as formic acid, acetic acid, or benzoic acid. The concentration of the formic acid in the parting agent may be 2~20 wt %. The immersion in the acid parting agent causes the paint material to dissolve, or to swell to be detached from the housing.

After taken out from the second alkali parting agent (or the acid agent), the housing is subjected to washing at Step 16. The washing may be performed with the use of a shower (the hydraulic pressure: 0.5~2 kgf/cm$^2$). Alternatively, the housing may be washed in a bath. As a result of the washing, the paint material on the housing's surface is removed.

At Step 17, the second alkali parting agent (or acid parting agent) remaining on the housing is neutralized. For neutralizing the alkali agent, the housing may be immersed in an acid solution bath containing e.g. formic acid. The volume of the acid solution may be 10~20 times that of the housing. The temperature of the acid solution may be 10~30° C. The suitable immersion time and acid concentration may vary depending on the parting agent remaining on the housing. When an acid parting agent is used at Step 15 instead of an alkali agent, the housing is immersed in an alkali solution bath (containing e.g. sodium hydroxide) for the neutralization. The volume of the alkali solution may be 10~20 times greater than that of the housing. The temperature of the alkali solution may be 10~30° C. The suitable immersion time and alkali concentration may vary depending on the acid parting agent remaining on the housing.

At Step 18, the housing may be washed in the same manner as performed at Step 16 for removal of the paint material. When the paint removal proves to be insufficient after the washing is over, Steps 12~18 may be repeated. According to the present invention, Steps 17 and 18 may be omitted when an alkali parting agent is used for the second chemical treatment at Step 15.

Through Steps 11~18, most of the paint material on the housing may be removed, while some may linger at complicatedly configured portions of the housing. At Step 19, such tenacious paint material is scraped off by a suitable scraper. This scraping process is optional and does not need to be performed when all the paint material has been removed by the previous steps 11~18.

At Step 20, the housing is dried. This may be achieved by heating the housing in a drier at a temperature of 50~80° C. for 30~60 minutes.

The housing, with the paint material removed, is subjected to a Mg-alloy reproduction procedure described below. As known in the art, when a Mg-alloy is recycled, the Fe-component of the material tends to increase, while the Mn-component thereof tends to decrease. In light of this, according to the present invention, the contents of Fe- and Mn-components in the alloy are adjusted so that a desired Mg-alloy (which may be equal to JIS MD1D or AZ91D) is reproduced.

Specifically, at Step 21, the housing is put into a smelter together with powdered flux ("first flux"). For facilitating the dissolution, the housing may preferably be broken into pieces before put into the smelter. Initially (i.e. before the housing and the first flux are introduced), the smelter may be heated up to a temperature of about 680° C. Then, after the housing and the first flux are loaded, the temperature of the smelter may be increased to about 720° C., for example, to dissolve the housing and the flux. The molten material may be agitated by the rotation of a stirrer for homogenizing purposes. The first flux is added mainly for reduction of oxides produced in the dissolution. Further, at a later stage, the first flux can sediment impurities (e.g. oil) contained in the molten material. For the first flux, use may be made of a halide of an alkali metal or alkali-earth metal. More specifically, the first flux may be a powdered mixture containing 40~60 wt % of $MgCl_2$, 15~35 wt % of KCl, 1~10 wt % of $CaF_2$, and 10~30 wt % of $BaCl_2$. An additional amount of the first flux may be put in the molten material when there is ignition on the surface of the molten material.

At Step 22, the molten material is kept stirred so that the contained impurities are separated as sludge. When some sludge is observed, powdered flux ("second flux") is added to the molten material for accelerating the separation of the sludge. The second flux may be basically the same as the first flux in ingredient, but differ in proportion. Preferably, the second flux may contain a smaller amount of $BaCl_2$ (which has a relatively great specific gravity) than the first flux. Specifically, the second flux may contain 60~75 wt % of $MgCl_2$, 20~35 wt % of KCl, 0.1~5 wt % of $CaF_2$, and 1~10 wt % of $BaCl_2$. An additional amount of $BaCl_2$ may be put in the molten material when there is ignition on the surface of the molten material.

At 23, the molten material is purified. Specifically, with the stirring ceased, the molten material is allowed to rest for 10~30 minutes, so that the separated sludge will sediment on the bottom of the smelter. For this process, a gas layer may preferably be formed to cover the surface of the molten material for prevention of oxidation. To this end, powdered flux ("third flux") is added to the molten metal. The third flux is decomposed by the heat of the molten metal to produce gas. This gas fills the inner space of the smelter to form the oxidation preventing layer covering the surface of the molten material. The third flux may be a powdered mixture contain 60~90 wt % of sulfur (S) and 10~40 wt % of $MgF_2$, for example.

At Step 24, the components of the purified molten material are analyzed. Specifically, a part of the molten material is extracted to be cast into a cylindrical sample (5 cm in diameter; 10 cm in length). The sample is subjected to an emission spectro-photometric analysis (electric arc-type), for example, to determine the Fe content and Mn content of the molten material.

At Step 25, the Fe content and Mn content of the molten material are adjusted, based on the results of the analysis conducted at Step 24. When a forging Mg-alloy equal in properties to AZ91D is desired to be made, for instance, the Fe content may need to be no greater than 40 ppm (0.004 wt %), while the Mn content may need to be in a range of 0.17~0.4 wt %.

As noted above, the Mg-alloy recycling tends to increase the Fe content of the molten material. Thus, for adjustment of the Fe content, a suitable amount of Fe-precipitant is added to the molten material. The Fe-precipitant may be Al—Mn intermetallic compound, for example. The Mn content of the molten material, on the other hand, tends to be decreased during the Mg-alloy recycling. The lost Mg is compensated by adding a suitable amount of Mn to the molten material. The supplier of Mn may be a Mn compound (the above-mentioned Al—Mn intermetallic compound, for example). If the Fe content and Mn content of the molten material are in the desired range, no Fe precipitant nor Mn supplier are added.

After the component adjustment is over, the molten material is stirred and purified again, to be subjected to the second component analysis (as at Step 24). This may be repeated several times until the desired Fe and Mn contents are attained.

Finally, at Step 26, the molten material is cast into ingots of the prescribed size.

In accordance with the procedure described above, it is possible to reproduce Mg-alloy material effectively. Specifically, at Step 11, a partial material removal is performed with respect to the paint layer on the housing by cutting or wet blasting. With such a preliminary treatment given to the paint layer, the parting agent can easily penetrate into the paint material, whereby the time taken for the paint-removing process is advantageously reduced. In addition, when the areal peel rate is equal to or greater than 90% (Step 14), the second chemical treatment (Step 15), the washing (Step 16), etc., will not be performed. Accordingly, the overall paint-removing time and the production cost can be significantly reduced.

Figure 3:
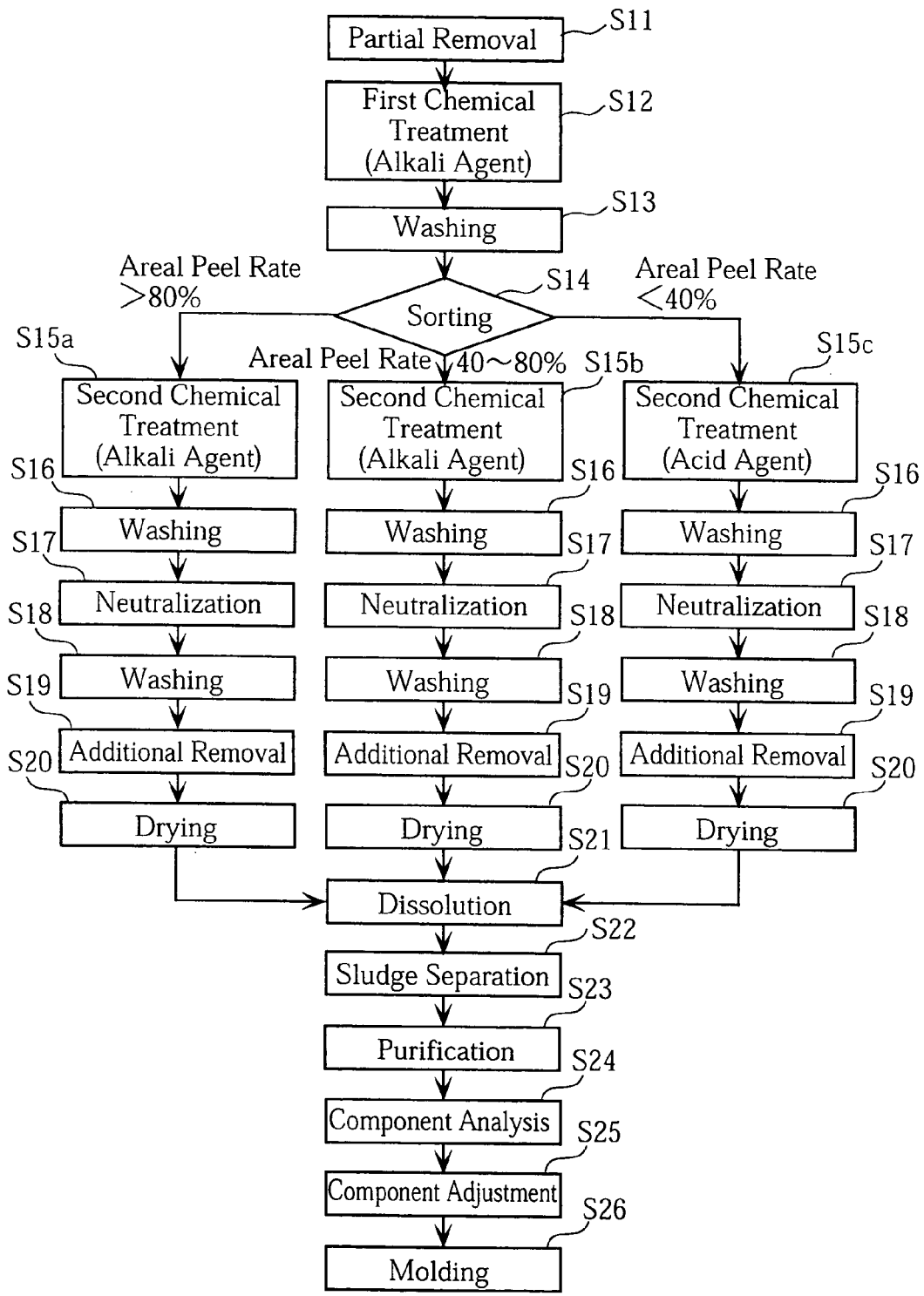
FIG. 3 is a flow chart showing a material reproducing procedure in accordance with another embodiment of the present invention.

Reference is now made to FIG. 3 showing a flow chart for a second embodiment of the present invention. In the figure, the steps identical or similar to those of the first embodiment are designated by the same reference signs.

As shown in FIG. 3, the painted housing is subsequently subjected to partial removal of the paint material at Step 11, a first chemical treatment at Step 12, washing at Step 13 and sorting at Step 14. At the sorting procedure of the second embodiment, housings are classified into three groups depending on the areal peel rate of the paint material. The first group is for a housing whose areal peel rate is greater than 80%, the second group is for a housing whose areal peel rate is 40%~80%, and the third group is for a housing whose areal peel rate is smaller than 40%. It should be noted that the present invention is not limited to this example, and the housings may be classified into two groups or more than three groups in accordance with suitably determined ranges of the areal peel rate.

At Step 15a, the housing, which belongs to the first group (Areal Peel Rate>80%), is immersed in an alkali parting agent ("second alkali parting agent"). At Step 15b, the housing, which belongs to the second group (Areal Peel Rate in a range of 40~80%), is immersed in an alkali parting agent ("third alkali parting agent"). At Step 15c, the housing, which belongs to the third group (Areal Peel Rate<40%), is immersed in an acid parting agent. Preferably, the second alkali parting agent is smaller in alkali content than the third alkali parting agent. Either one of the second and the third alkali parting agents may be the same one as the first alkali parting agent.

After the second chemical treatment at Step 15a, 15b or 15c is performed, the housing is subjected to Steps 16~26 in the same manner as for the first embodiment described above.

In accordance with the procedure shown in FIG. 3, an acid parting agent is not used by the second chemical treatment when the areal peel rate is equal to or greater than 40% (Steps 15a, 15b). This prevents the Mg-alloy housing from being eroded by the acid which would otherwise be used. Further, in the above procedure, the alkali contents of the second and the third alkali parting agents are varied depending on the areal peel rate of the paint layer. This is advantageous to making less use of the stronger alkali parting agent, thereby contributing to providing a safer working environment for the operator engaging in the paint removing procedure.

FIG. 4 is a flow chart illustrating a third embodiment of the present invention. As readily seen, the procedure of the third embodiment is the same as that of the second embodiment (FIG. 3), except that the sorting is performed twofold (Steps 14a, 14b). Specifically, in accordance with the procedure of FIG. 4, it is determined at the first sorting step 14a whether the areal peel rate of the paint layer is no smaller than 90%. When the areal peel rate is equal to or greater than 90%, the housing is directly sent to the dissolution process at Step 21 without being subjected to the second chemical treatment nor the subsequent steps (S16~S20). When the areal peel rate is smaller than 90%, on the other hand, the housing is subjected to the second sorting at Step 14b. This step is the same as the sorting step S14 shown in FIG. 3.

The advantages of the present invention will be understood more clearly from the description of the following "Case 1" and "Case 2".

Case 1

First, two hundred and ten housings as shown in FIG. 2 were prepared. Each housing was made of Mg-alloy and painted. The 210 housings can be classified into three groups (each containing 70 housings) depending on the kind of the paint layer formed on the housings. The first group was "Epoxy group", the second group "Urethane group", and the third group "Acrylic group". The paint layer formed on each of the 210 housings was composed of a lower sub-layer (primer) and an upper sub-layer covering the lower sub-layer. For the housings belonging to the Epoxy group, the lower sub-layer was made of epoxy-based Mag Powder #1000 (by DAI NIPPON TORYO CO.,LTD), and the upper sub-layer was made of epoxy-based Magdine EP1000 (by NIPPON PAINT CO.,LTD). For the housings belonging to the Urethane group, the lower sublayer was made of acrylic silicon-based UB Primer (by MIKASA PAINT CO.,LTD), and the upper sub-layer was made of urethane-based NC-7 (by YUKOSHA CO.,LTD). For the housings belonging to the Acrylic group, the lower sub-layer was made of acrylic silicon-based UB Primer (by MIKASA PAINT CO.,LTD), and the upper sub-layer was made of acrylic urethane-based PS High-Coat B (by MIKASA PAINT CO.,LTD).

Then, cuts were made in the paint layer formed on each of the 210 housings. The adjacent cuts were spaced from each other by 50 mm.

Then, all the housings were held in a jig and immersed in a first alkali parting agent (800 dm$^3$) which contained 3.5 wt % of potassium hydroxide, 2.5 wt % of sodium hydroxide, 20 wt % of anion surface-active agent, and 40 wt % of diethylene glycol monoethyl ether. The first alkali parting agent was kept at 70° C. The immersion time was ten minutes. By this chemical treatment (first chemical treatment), the paint layer was swelled and partially peeled.

Then, the housings held by the jig were taken out of the alkali parting agent, and immersed in first washing water (800 dm$^3$) to be washed. As a result, about 90% of the 70 housings of the "Epoxy group" underwent an areal peel rate equal to or greater than 90%. These particular housings were sorted out to bypass the subsequent second chemical treatment and some other relevant processes (see Step 14 in FIG. 1). The remaining 10% of the "Epoxy group" housings (called the "unsorted Epoxy housings" below) were subjected to a further paint removal procedure described below. Tuning to the housings belonging to the Urethane and Acrylic groups, the washing by the first washing water peeled only the upper sub-layers of the respective paint layers.

The "unsorted Epoxy housings" were immersed in an acid parting agent (800 dm$^3$) which contained 5 wt % of formic acid, 30 wt % of aromatic alcohol, and 30 wt % of ethylene glycol monobutyl ether. The acid parting agent was kept at 60° C. The immersion time was 10 minutes. By such a chemical treatment ("second chemical treatment"), the paint layer was partly decomposed, and partly peeled by swelling.

After taken out of the acid parting agent, the unsorted Epoxy housings were washed in second washing water (800 dm$^3$).

Then, the washed housings were immersed in an alkali solution (800 dm$^3$) for neutralizing the acid remaining on the housings. The alkali solution contained 5 wt % of sodium hydroxide. The alkali solution was kept at room temperature. The immersion time was 5 minutes.

After taken out of the alkali solution, the housings were washed in third washing water (800 dm$^3$).

Through the above procedure, about 50% of the unsorted Epoxy housings underwent the complete peel of their paint layers. Regarding the other 50% of the unsorted Epoxy housings, the paint material was mostly removed from the surface of each housing, with only small amounts of paint left unremoved from side walls, cavities, or so on, of the housing. These tenacious remnants were removed physically (nonchemically) with the use of a scraper. Thereafter, the paint-removed housings were dried.

Then, the paint-removed housings (30 kg), together with first flux (1 kg), were put into a smelter preheated at about 680° C. To melt the housings, the smelter was heated up to 720° C. The first flux was a powdered mixture containing 50 wt % of $MgCl_2$, 25 wt % of KCl, 5 wt % of $CaF_2$, and 20 wt % of $BaCl_2$. The melted Mg-alloy material continued to be stirred by a rotor operating at 1000 rpm for homogenizing purposes.

When sludge separation began, 0.2 kg of second flux was added to the molten Mg-alloy. The second flux was a powdered mixture containing 67.5 wt % of $MgCl_2$, 27.5 wt % of KCl, 1 wt % of $CaF_2$, and 4.5 wt % of $BaCl_2$. After the first supply of the second flux, an additional dose of the second flux (0.1 kg) was put into the molten material a suitable number of times, depending on the ignition condition on the surface of the molten material. The addition of the second flux facilitated the separation of sludge from the molten Mg-alloy.

Then, with the agitation by the rotor ceased, the molten material was at rest for 20 minutes, to allow the sludge in the molten material to precipitate. More specifically, as soon as the rotor was stopped, third flux (0.2 kg) was added to the molten material. The third flux was a powdered mixture containing 80 wt % of S and 20 wt % of $MgF_2$. The addition of the third flux resulted in the generation of $SF_6$. The $SF_6$ gas filled the smelter, thereby forming an oxidation-preventing gas layer which covered the surface of the molten material. In this state, the sludge was precipitated, whereby the molten material was purified.

Then, a prescribed amount (0.2 kg) of portion was extracted from the purified molten material to be cast into a cylindrical sample (5 cm in diameter; 10 cm in length). This sample was subjected to the component analysis with the use of an emission spectro-photometric analyzer (PDA-5500II by SHIMADZU CORPORATION). The result was that the Fe-content was 0.0058 wt % and the Mn-content was 0.120 wt %.

Then, an Al—Mn intermetallic compound was supplied into the smelter for both reducing the Fe-content and increasing the Mn-content. The amount of the supplied Al—Mn intermetallic compound was 4 kg, so that the resultant Mg-alloy material would have a Fe-content of 0.004 wt % or less and a Mn-content of 0.17~0.4 wt % (the content values equal to those of AZ91D).

After the above component adjustment, the molten material was stirred and then kept at rest for 10 minutes for purification.

Then, a prescribed amount (0.2 kg) of portion was extracted from the purified material to be cast into a cylindrical sample (5 cm in diameter; 10 cm in length). This sample was subjected to the component analysis with the use of the above-mentioned analyzer (PDA-5500II by SHIMADZU CORPORATION). The result was that the Fe-content was reduced below 0.0015 wt %, while the Mn-content was increased to be 0.210 wt %.

Finally, five ingots (5 kg for each) were made from the component-adjusted molten material.

<Flexural Strength Test>

The reproduced Mg-alloy material obtained in the above manner was used to make five test pieces (10 mm×50 mm×3.2 mm; JIS Z2204 No.1) by die-casting. These test pieces were subjected to a flexural strength test using a test machine INSTORON 5581 (by INSTRON JAPAN CO., LTD). Specifically, each test piece was subjected to a three-point bending test (test conditions in conformity to JIS K7055), whereby the span between the two bearings was 40 mm, and the loading velocity was 2 mm/min. Besides the test pieces of the reproduced material, another set of five test pieces (JIS z2204 No.1) were made from a virgin alloy (AZ91D). These test pieces were also subjected to a three-point bending test under the same conditions as for the first set of five test pieces. The result was that the test pieces of the reproduced material were substantially equal in flexural strength to the test pieces of the virgin material. The average of the flexural strength of the former test pieces was about 400 MPa, and the difference between the maximum value and the minimum value was advantageously small.

<Corrosion Resistance Test>

The reproduced Mg-alloy material obtained in the above manner was used to make five test pieces (10 mm×50 mm×3.2 mm; JIS Z2204 No.1) by die-casting. These test pieces were subjected to a corrosion resistance test by salt water spraying (the test conditions in conformity to JIS Z2371). The same corrosion resistance test was conducted to another set of five test pieces made of the virgin material (AZ91D). The result was that the test pieces of the reproduced Mg-alloy had substantially the same corrosion resistance as the test pieces of the virgin material.

<Formability Evaluation>

The reproduction Mg-alloy material obtained in the above manner was used to make 50 housings (320 mm×240 mm×1.2 mm) as shown in FIG. 2. Also, the same number of identical housings were made of the virgin material for formability comparison between the two kinds of materials. The result was that the reproduced Mg-alloy exhibited as excellent formability as the virgin material. Specifically, about 83% of the housings made of the reproduced Mg-alloy (and the virgin material as well) proved to be defectless, that is, suffering no such defects as voids, wrinkling, chipping, and so on.

Case 2

As in Case 1, two hundred and ten housings as shown in FIG. 2 were prepared. Each housing was made of Mg-alloy and painted. The paint layer on each housing consisted of a lower sub-layer made of acrylic silicon-based UB Primer (by MIKASA PAINT CO.,LTD), and an upper sub-layer made of acrylic urethane-based PS High-Coat B (by MIKASA PAINT CO.,LTD).

Then, wet-blasting was conducted to the paint layers on the respective housings. The moving velocity of the blast nozzle was 10 mm/s, and the injection pressure was 0.27 MPa. For partial physical removal of the paint layer, a liquid abrasive agent was blown against the paint layer. The abrasive agent contained 20 wt % of alumina particles having an average particle size of about 130 μm. The abrasive agent was kept at room temperature. The wet-blast process removed part of the paint layer and made tiny pits in the paint surface.

Then, in the same manner as in Case 1, the 210 housings were subjected to a first chemical treatment with the use of an alkali parting agent, and then to washing in a water bath. As a result, the paint layers on the housings were partially removed. Of all the 210 housings, about 15% housings were classified into Group A (the areal peel rate>80%), about 50% housings into Group B (the areal peel rate in a range of 40~80%), and about 35% housings into Group C (the areal peel rate<40%). In the manner described below, the housings belonging to the respective groups were subjected to a second chemical treatment.

The housings belonging to Group A were immersed in a first alkali parting agent (800 $dm^3$) containing 3.5 wt % of potassium hydroxide, 2.5 wt % of sodium hydroxide, 20 wt % of anion surface-active agent, and 40 wt % of diethylene glycol monoethyl ether. The first alkali parting agent was kept at 70° C. The immersion time was 20 minutes.

The housings belonging to Group B were immersed in a second alkali parting agent (800 $dm^3$) containing 35 wt % of potassium hydroxide, 14 wt % of monoehanolamine, and 10 wt % of diethylene glycol monoethyl ether. The second alkali parting agent was kept at 80° C. The immersion time was 20 minutes.

The housings belonging to Group C were immersed in an acid parting agent (800 dm$^3$) containing 5 wt % of formic acid, 30 wt % of aromatic alcohol, and 30 wt % of ethylene glycol monobutyl ether. The acid parting agent was kept at 60° C. The immersion time was 20 minutes.

In the above procedures, all the housings of Groups A, B and C underwent complete paint removal.

Thereafter, a reproduced Mg-alloy material was obtained from the paint-removed housings in the same manner as in Case 1. This reproduced material was also subjected to a flexural strength test, a corrosion resistance test, and formability evaluation. The result was that the reproduced Mg-alloy of Case 2 was substantially equal in properties to the virgin Mg-alloy.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. A method of removing a paint layer formed on a Mg-alloy material, the method comprising:
   a partial removing step for physically and partially removing the paint layer;
   a first chemical removing step for peeling the paint layer by application of a first alkali parting agent to the paint layer; and
   a second chemical removing step, utilizing another parting agent different from the first alkali parting agent applied to the paint layer when an areal peel rate of the paint layer is smaller than 90% after the first chemical removing step.

2. The method according to claim 1, wherein the partial removing step is conducted to make cuts in the paint layer by a cutter or to perform wet blasting to the paint layer.

3. The method according to claim 1, wherein the partial removing step is conducted to remove 20~50% of the paint layer.

4. The method according to claim 1, wherein the second chemical removing step is conducted by using one of a plurality of parting agents in accordance with the areal peel rate of the paint layer.

5. The method according to claim 4, wherein the plurality of parting agents include an acid parting agent and a second alkali parting agent different from the first alkali parting agent.

6. The method according to claim 1, wherein the first alkali parting agent contains potassium hydroxide.

7. The method according to claim 5, wherein the acid parting agent contains an organic acid.

8. The method according to claim 5, further comprising a step for neutralizing an acid parting agent applied on the paint layer.

9. The method according to claim 8, wherein the neutralizing step is conducted by using sodium hydroxide.

10. The method according to claim 1, further comprising a physical removing step for removing the paint layer after the second chemical removing step is conducted.

11. The method according to claim 1, further comprising a washing step for washing the Mg-alloy material by water immediately after the first chemical removing step.

12. The method according to claim 1, wherein a cycle including the first chemical removing step and the second chemical removing step is conducted repeatedly.

* * * * *

UNITED STATES PATENT AND TRADEMARK OFFICE
CERTIFICATE OF CORRECTION

| | |
|---|---|
| PATENT NO. | : 7,056,445 B2 |
| APPLICATION NO. | : 10/642133 |
| DATED | : June 6, 2006 |
| INVENTOR(S) | : Koichi Kimura et al. |

Page 1 of 1

It is certified that error appears in the above-identified patent and that said Letters Patent is hereby corrected as shown below:

Column 11   line 29 (claim 1) after "agent", insert --,--.

Signed and Sealed this

Twenty-first Day of November, 2006

JON W. DUDAS
*Director of the United States Patent and Trademark Office*